US 9,279,910 B2

(12) United States Patent
Ding et al.

(10) Patent No.: US 9,279,910 B2
(45) Date of Patent: Mar. 8, 2016

(54) COLOR SHIFT OF HIGH LSG LOW EMISSIVITY COATING AFTER HEAT TREATMENT

(71) Applicant: Intermolecular Inc., San Jose, CA (US)

(72) Inventors: Guowen Ding, San Jose, CA (US); Jeremy Cheng, Cupertino, CA (US); Tong Ju, Santa Clara, CA (US); Minh Huu Le, San Jose, CA (US); Daniel Schweigert, Fremont, CA (US); Guizhen Zhang, Santa Clara, CA (US)

(73) Assignee: Intermolecular, Inc., San Jose, CA (US)

( * ) Notice: Subject to any disclaimer, the term of this patent is extended or adjusted under 35 U.S.C. 154(b) by 146 days.

(21) Appl. No.: 13/801,465

(22) Filed: Mar. 13, 2013

(65) Prior Publication Data

US 2014/0272353 A1    Sep. 18, 2014

(51) Int. Cl.
*C03C 17/36* (2006.01)
*C23C 14/14* (2006.01)
*G02B 1/10* (2015.01)
*G02B 5/28* (2006.01)

(52) U.S. Cl.
CPC ............... *G02B 1/10* (2013.01); *C03C 17/366* (2013.01); *C03C 17/3618* (2013.01); *C03C 17/3644* (2013.01); *G02B 5/282* (2013.01); *G02B 5/285* (2013.01); *C03C 17/3639* (2013.01); *C03C 17/3652* (2013.01); *C03C 2217/256* (2013.01); *Y10T 428/24975* (2015.01); *Y10T 428/265* (2015.01)

(58) Field of Classification Search
CPC ........................ C03C 17/3644; C03C 17/366
See application file for complete search history.

(56) References Cited

U.S. PATENT DOCUMENTS

| 5,834,103 | A  |   | 11/1998 | Bond |
| 5,948,538 | A  | * | 9/1999  | Brochot et al. ............... 428/432 |
| 6,045,896 | A  | * | 4/2000  | Boire et al. ................... 428/216 |
| 6,451,434 | B1 | * | 9/2002  | Ebisawa et al. ............... 428/432 |
| 6,899,953 | B1 | * | 5/2005  | O'Shaughnessy et al. ... 428/432 |
| 7,037,577 | B2 |   | 5/2006  | Macquart |
| 7,056,588 | B2 |   | 6/2006  | Neuman |
| 7,153,579 | B2 |   | 12/2006 | Kriltz |
| 7,339,728 | B2 |   | 3/2008  | Hartig |
| 7,413,768 | B2 | * | 8/2008  | O'Shaughnessy ............ 427/162 |
| 7,632,571 | B2 | * | 12/2009 | Hartig et al. .................. 428/432 |
| 7,659,002 | B2 | * | 2/2010  | Coster et al. .................. 428/432 |
| 8,003,235 | B2 |   | 8/2011  | Gagliardi |
| 2003/0180547 | A1 | * | 9/2003 | Buhay et al. .................. 428/434 |
| 2004/0016202 | A1 |   | 1/2004 | Hoffman |
| 2004/0229073 | A1 | * | 11/2004 | Dietrich et al. ............... 428/627 |
| 2005/0238923 | A1 | * | 10/2005 | Thiel ............................. 428/701 |
| 2006/0124449 | A1 | * | 6/2006 | Hartig et al. ............. 204/192.15 |
| 2006/0280951 | A1 | * | 12/2006 | Fleury et al. .................. 428/432 |
| 2007/0009747 | A1 | * | 1/2007 | Medwick et al. ............. 428/432 |
| 2007/0036989 | A1 | * | 2/2007 | Medwick et al. ............. 428/432 |
| 2007/0082169 | A1 | * | 4/2007 | Hartig ............................. 428/69 |
| 2007/0212530 | A1 | * | 9/2007 | Berteau et al. ................ 428/212 |
| 2007/0242359 | A1 | * | 10/2007 | Thielsch et al. .............. 359/585 |

(Continued)

*Primary Examiner* — Aaron Austin
*Assistant Examiner* — Zheren J Yang (57) ABSTRACT

Low emissivity panels can include a protection layer of silicon nitride on a layer of ZnO on a layer of $Zn_2SnO_x$. The low emissivity panels can also include $NiNbTiO_x$ as a barrier layer. The low emissivity panels have high light to solar gain, color neutral, together with similar observable color and light transmission before and after a heat treatment process.

18 Claims, 9 Drawing Sheets

(56) References Cited

U.S. PATENT DOCUMENTS

| | | |
|---|---|---|
| 2008/0187692 A1* | 8/2008 | Roquiny et al. ............. 428/34 |
| 2008/0311389 A1* | 12/2008 | Roquiny et al. ............. 428/336 |
| 2009/0142602 A1* | 6/2009 | Medwick et al. ............. 428/428 |
| 2009/0258222 A1* | 10/2009 | Roquiny et al. ............. 428/336 |
| 2010/0062245 A1* | 3/2010 | Martin et al. ............. 428/336 |
| 2010/0136365 A1* | 6/2010 | Unquera et al. ............. 428/623 |
| 2010/0167034 A1* | 7/2010 | Depauw et al. ............. 428/216 |
| 2010/0279144 A1 | 11/2010 | Frank |
| 2011/0020638 A1* | 1/2011 | Di Stefano ............. 428/336 |
| 2011/0236715 A1* | 9/2011 | Polcyn et al. ............. 428/623 |
| 2012/0219821 A1* | 8/2012 | Frank et al. ............. 428/630 |
| 2012/0225317 A1* | 9/2012 | Imran et al. ............. 428/630 |
| 2014/0017472 A1* | 1/2014 | Coster et al. ............. 428/219 |
| 2014/0087160 A1* | 3/2014 | McSporran et al. ............. 428/216 |
| 2014/0347722 A1* | 11/2014 | Hevesi ............. 359/359 |

* cited by examiner

COLOR SHIFT OF HIGH LSG LOW EMISSIVITY COATING AFTER HEAT TREATMENT

FIELD OF THE INVENTION

The present invention relates generally to films providing high transmittance and low emissivity, and more particularly to such films deposited on transparent substrates.

BACKGROUND OF THE INVENTION

Sunlight control glasses are commonly used in applications such as building glass windows and vehicle windows, typically offering high visible transmission and low emissivity. High visible transmission can allow more sunlight to pass through the glass windows, thus being desirable in many window applications. Low emissivity can block infrared (IR) radiation to reduce undesirable interior heating.

In low emissivity glasses, IR radiation is mostly reflected with minimum absorption and emission, thus reducing the heat transferring to and from the low emissivity surface. Low emissivity, or low-e, panels are often formed by depositing a reflective layer (e.g., silver) onto a substrate, such as glass. The overall quality of the reflective layer, such as with respect to texturing and crystallographic orientation, is important for achieving the desired performance, such as high visible light transmission and low emissivity (i.e., high heat reflection). In order to provide adhesion, as well as protection, several other layers are typically formed both under and over the reflective layer. The various layers typically include dielectric layers, such as silicon nitride, tin oxide, and zinc oxide, to provide a barrier between the stack and both the substrate and the environment, as well as to act as optical fillers and function as anti-reflective coating layers to improve the optical characteristics of the panel.

Low-emissivity coatings can also be engineered to provide desired shading properties. When sunlight reaches a window, a portion can pass through the window, a portion can be reflected back, and a portion cab be absorbed, which can heat up various parts of the window. A portion of the absorbed heat can flow to the inside of the house, heating up the air in the house. Thus, then sunlight hits a glass window, in addition to lighting the interior, the incident solar radiation can also pass through the window to warm up the house. Solar Heat Gain Coefficient (SHGC) is then defined as the fractional amount of the solar energy that strikes the window that ends up warming the house. Other terms can also be used, such as solar shading property or Light to Solar Gain (LSG), which is used to describe the relationship between lighting and heating from solar irradiation. Light to Solar Gain is defined as the ratio of visible light transmission to solar heat gain coefficient. In the hot weather, it is desirable to have high LSG glass. For example, commercial glass coatings are generally recommended to have LSG greater than 1.8.

There can be a tradeoff between having high visible transmittance and high light to solar gain. Transparent glass can provide high light transmittance but also high solar gain, e.g., low light to solar gain. Dark glass can provide low solar gain, but also low light transmittance. Ag coating low emissivity coating glass can provide significant improvements in terms of both visible light transmittance and light to solar gain properties. However, further improvements in light to solar gain is difficult, for example, low emissivity coatings having thicker Ag layer, or having multiple Ag layers, e.g., double Ag layer or triple Ag layer, can reduce the solar heat gain, but at the expense of lower light transmission.

Another desired characteristic of the glass coatings is color neutral property, e.g., colorless glass. The glass coatings should not exhibit observable hues, e.g., more red or blue than is desired.

Another desired characteristic of the glass coatings temperature matchability, e.g., similar performance and appearance before and after heat treatment. Since glass can be tempered, e.g., involving heating the glass to 600-700° C., the low-emissivity coatings can change significantly during the heat treatment process. To accommodate the tempering changes, low-emissivity coatings can be provided in a temperable version (e.g., heat treated) and a non-temperable version (non heat treated). The film stack of the temperable version can be designed to have properties matching those of the non-temperable version.

It would be desirable to provide low-emissivity coatings that can provide high visible transmittance, high light to solar gain, color neutral, and thermal stability for color and optical performance.

SUMMARY OF THE DISCLOSURE

In some embodiments, methods, and coated panels fabricated from the methods, are disclosed to form multiple coatings, e.g., multiple infrared reflective layers, with minimal color change before and after heat treatments. For example, by adding a separation layer between protective coatings of zinc tin oxide and silicon nitride, the interaction between these protective coating can be reduced under high temperature exposures, leading to minimal color changes. The separation layer can include a zinc oxide layer, with a thickness between 2 and 8 nm, such as 4 nm.

In some embodiments, the multiple infrared reflective layers can be protected by layers of zinc tin oxide, together with Ni—Nb—Ti oxide barrier layers, which can further improve the color resistance to thermal exposures. The layers of zinc tin oxide can include $Zn_2SnO_x$, with x less than or equal to about 4. The Ni—Nb—Ti oxide barrier layer can have between 10 and 30 at % oxygen content, for example, by forming in a partial pressure oxidation ambient

BRIEF DESCRIPTION OF THE DRAWINGS

To facilitate understanding, identical reference numerals have been used, where possible, to designate identical elements that are common to the figures. The drawings are not to scale and the relative dimensions of various elements in the drawings are depicted schematically and not necessarily to scale.

The techniques of the present invention can readily be understood by considering the following detailed description in conjunction with the accompanying drawings, in which.

DETAILED DESCRIPTION OF THE DISCLOSURE

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

In some embodiments, methods, and coated panels fabricated from the methods, are disclosed to form low emissivity coatings that can provide high visible transmission, high light to solar gain, and minimal color change before and after heat treatments. The low emissivity coatings can include multiple infrared reflective layers to increase the light to solar gain property. The low emissivity coatings can include material and thickness optimization to increase the visible transmission property. Further, the low emissivity coatings can include a top stack (e.g., the coated layers between the external ambient and the infrared reflective stack) to cover the low emissivity coatings. The top stack can include a layer of silicon nitride (e.g., SiN) on a layer of zinc oxide (e.g., ZnO) on a layer of zinc tin oxide (e.g., $Zn_2SnO_x$). The zinc tin oxide layer can improve the performance of the low emissivity stack, especially with respect to the thermal stability of the color appearance after a high temperature heat treatment. The zinc oxide layer can act as a separation layer between the zinc tin oxide and the silicon nitride, e.g., to prevent potential interactions between the zinc tin oxide and the silicon nitride, especially during the heat treatment process. The high temperature treatment can include annealing at temperatures between 500 and 1000 C.

The thicknesses of the zinc oxide layer can be optimized for best performance. For example, thin zinc oxide layer may not be adequate to isolate the zinc tin oxide from the silicon nitride. Thick zinc tin oxide layer can affect the thermal stability, e.g., the appearance and optical properties of the low emissivity coatings can be observably different for as-coated (e.g., before heat treatment) and heat-treated low emissivity coatings. In some embodiments, the thickness of the zinc oxide layer can be between 2 and 8 nm, for example, between 3 and 4 nm.

In some embodiments, the zinc tin oxide layer can include a zinc tin oxide of $Zn_2SnO_x$, with x less than or equal to about 4. The thickness of the zinc tin oxide layer can be reduced appropriately due to the inclusion of the zinc oxide layer. For example, without the zinc oxide layer, a zinc tin oxide layer can have a thickness of between 4 and 12 nm, such as 9 nm, for optimized performance. A double layer stack of zinc oxide on zinc tin oxide can have the same overall thickness distributed between the two layers. For example, by replacing a 9 nm zinc tin oxide layer with a double layer stack of a 3 nm zinc oxide layer on a 6 nm zinc tin oxide layer, the optical and color difference between as-coated and heat-treated low emissivity coatings can be reduced (e.g., reflective color change $R_f\Delta E^*$ and $R_g\Delta E^*$, to be discussed in the example section below), together with improvements in visible light transmission luminance (e.g., TY value, to be discussed in the example section below).

In some embodiments, the low emissivity coatings can include a Ni—Nb alloy barrier layer for the infrared reflective layers. The Ni—Nb alloy barrier layer can include nickel, niobium, and oxygen, together with titanium, aluminum or chromium. For example, the Ni—Nb alloy barrier layer can include a nickel niobium titanium oxide, such as $NiNbTiO_x$, with x between 10 and 30 at %. For example, the $NiNbTiO_x$ layer can be sputtered deposited in a partial oxygen pressure, e.g., in a mixture of oxygen and argon, to control the amount of oxygen content in the oxide barrier layer. The thickness of the Ni—Nb alloy barrier layer can be between 1 and 5 nm, e.g., sufficient to protect the infrared reflective underlayer.

The low emissivity coatings have high visible light transmission and improved light to solar gain, admitting light while blocking the heat associated with sun light. Further, the low emissivity coatings can be thermal resistant, for example, minimal color changes of the glass coatings after a high temperature exposure, for example, small value of $R_g\Delta E^*$ (color change of glass side reflection) and $R_f\Delta E^*$ (color change of film side reflection).

In some embodiments, methods and apparatuses for making coated panels are disclosed. The coated panels can include coated layers formed thereon, such as a low resistivity thin infrared reflective layer having a conductive material such as silver. The infrared reflective layer can include a conductive material, with the percentage of reflectance proportional to the conductivity. Thus a metallic layer, for example silver, can be used as infrared reflective layer in low emissivity coatings. To maintain the conductivity of the infrared reflective layer, e.g., silver layer, for example, against oxidation from deposition of subsequent layers or from subsequent high temperature anneals, a barrier layer can be formed on the silver layer.

In some embodiments, improved coated transparent panels, such as a coated glass, that has acceptable visible light transmission and IR reflection are disclosed. Methods of producing the improved coated transparent panels, which include specific layers in a coating stack, are also disclosed.

The coated transparent panels can include a glass substrate or any other transparent substrates, such as substrates made of organic polymers. The coated transparent panels can be used in window applications such as vehicle and building windows, skylights, or glass doors, either in monolithic glazings or multiple glazings with or without a plastic interlayer or a gas-filled sealed interspace.

Figure 1:
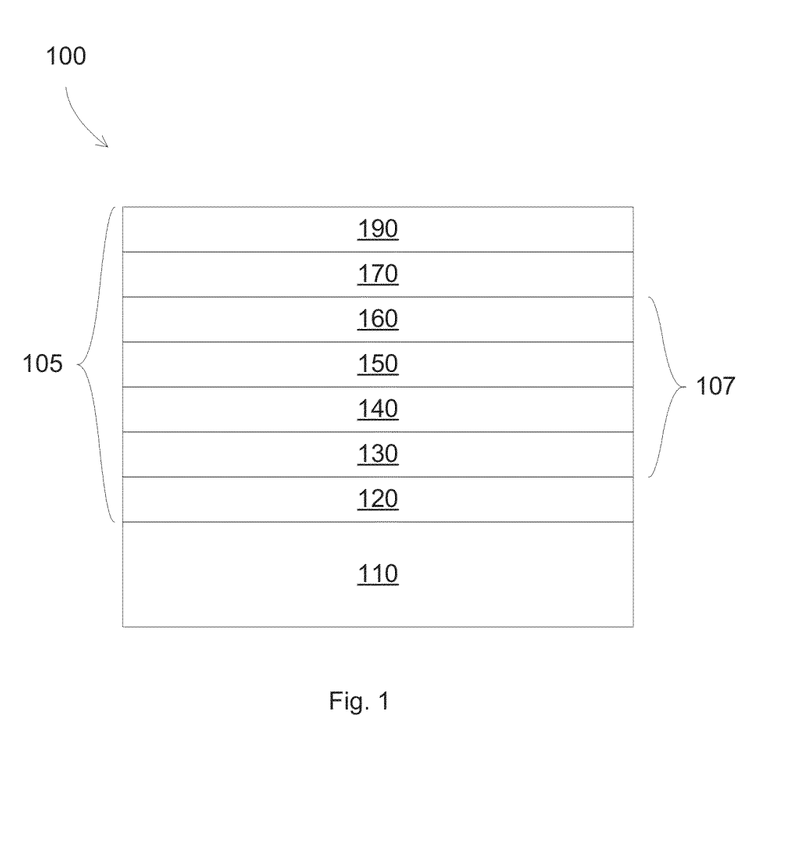
FIG. 1 illustrates a low emissivity transparent panel 100 according to some embodiments.

FIG. 1 illustrates a low emissivity transparent panel 100 according to some embodiments. The low emissivity transparent panel can include a glass substrate 110 and a low emissivity (low-e) stack 105 formed over the glass substrate 110. The glass substrate 110 in some embodiments is made of a glass, such as borosilicate glass, and has a thickness of, for example, between 1 and 10 millimeters (mm). The substrate 110 may be square or rectangular and about 0.5-2 meters (m) across. In some embodiments, the substrate 110 may be made of, for example, plastic or polycarbonate.

The low-e stack 105 can include a lower protective layer 120, an infrared reflective stack 107, an upper oxide 170, and an upper protective layer 190. The infrared reflective stack 107 can include a base oxide layer 130, a seed layer 140, a reflective layer 150, and a barrier layer 160. Some layers can be optional, and other layers can be added, such as interface layers or adhesion layers. Exemplary details as to the functionality provided by each of the layers 120-190 are provided below.

The various layers in the low-e stack 105 may be formed sequentially (i.e., from bottom to top) on the glass substrate 110 using a physical vapor deposition (PVD) and/or reactive (or plasma enhanced) sputtering processing tool. For example, the layers can be sputtered deposited using different processes and equipment, for example, the targets can be sputtered under direct current (DC), pulsed DC, alternate current (AC), radio frequency (RF) or any other suitable conditions. In some embodiments, the low-e stack 105 is formed over the entire glass substrate 110. However, in other embodiments, the low-e stack 105 may only be formed on isolated portions of the glass substrate 110.

The lower protective layer 120 is formed on the upper surface of the glass substrate 110. The lower protective layer 120 can include silicon nitride, silicon oxynitride, or other nitride material such as SiZrN, for example, to protect the other layers in the stack 105 from diffusion from the substrate 110 or to improve the haze reduction properties. In some embodiments, the lower protective layer 120 is made of silicon nitride and has a thickness of, for example, between about 10 nm to 50 nm, such as 25 nm.

The base layer 130 is formed on the lower protective layer 120 and over the glass substrate 110. The lower oxide layer is preferably a metal or metal alloy oxide layer and can serve as an antireflective layer. The lower metal oxide layer 130 may enhance the crystallinity of the reflective layer 150, for example, by enhancing the crystallinity of a seed layer 140 for the reflective layer 150, as is described in greater detail below.

The layer 140 can be used to provide a seed layer for the IR reflective layer, for example, a zinc oxide layer deposited before the deposition of a silver reflective layer can provide a silver layer with lower resistivity, which can improve its reflective characteristics. The seed layer 140 can include a metal such as titanium, zirconium, and/or hafnium, or a metal alloy such as zinc oxide, nickel oxide, nickel chrome oxide, nickel alloy oxides, chrome oxides, or chrome alloy oxides.

In some embodiments, the seed layer 140 can be made of a metal, such as titanium, zirconium, and/or hafnium, and has a thickness of, for example, 50 Å or less. Generally, seed layers are relatively thin layers of materials formed on a surface (e.g., a substrate) to promote a particular characteristic of a subsequent layer formed over the surface (e.g., on the seed layer). For example, seed layers may be used to affect the crystalline structure (or crystallographic orientation) of the subsequent layer, which is sometimes referred to as "templating." More particularly, the interaction of the material of the subsequent layer with the crystalline structure of the seed layer causes the crystalline structure of the subsequent layer to be formed in a particular orientation.

For example, a metal seed layer is used to promote growth of the reflective layer in a particular crystallographic orientation. In some embodiments, the metal seed layer is a material with a hexagonal crystal structure and is formed with a (002) crystallographic orientation which promotes growth of the reflective layer in the (111) orientation when the reflective layer has a face centered cubic crystal structure (e.g., silver), which is preferable for low-e panel applications.

In some embodiments, the crystallographic orientation can be characterized by X-ray diffraction (XRD) technique, which is based on observing the scattered intensity of an X-ray beam hitting the layer, e.g., silver layer or seed layer, as a function of the X-ray characteristics, such as the incident and scattered angles. For example, zinc oxide seed layer can show a pronounced (002) peak and higher orders in a θ-2θ diffraction pattern. This suggests that zinc oxide crystallites with the respective planes oriented parallel to the substrate surface are present.

In some embodiments, the terms "silver layer having (111) crystallographic orientation", or "zinc oxide seed layer having (002) crystallographic orientation" include a meaning that there is a (111) crystallographic orientation for the silver layer or a (002) crystallographic orientation for the zinc oxide seed layer, respectively. The crystallographic orientation can be determined, for example, by observing pronounced crystallography peaks in an XRD characterization.

In some embodiments, the seed layer 140 can be continuous and covers the entire substrate. Alternatively, the seed layer 140 may not be formed in a completely continuous manner. The seed layer can be distributed across the substrate surface such that each of the seed layer areas is laterally spaced apart from the other seed layer areas across the substrate surface and do not completely cover the substrate surface. For example, the thickness of the seed layer 150 can be a monolayer or less, such as between 2.0 and 4.0 Å, and the separation between the layer sections may be the result of forming such a thin seed layer (i.e., such a thin layer may not form a continuous layer).

The reflective layer 150 is formed on the seed layer 140. The IR reflective layer can be a metallic, reflective film, such as silver, gold, or copper. In general, the IR reflective film includes a good electrical conductor, blocking the passage of thermal energy. In some embodiments, the reflective layer 150 is made of silver and has a thickness of, for example, 100 Å. Because the reflective layer 150 is formed on the seed layer 140, for example, due to the (002) crystallographic orientation of the seed layer 140, growth of the silver reflective layer 150 in a (111) crystalline orientation is promoted, which offers low sheet resistance, leading to low panel emissivity.

Because of the promoted (111) textured orientation of the reflective layer 150 caused by the seed layer 140, the conductivity and emissivity of the reflective layer 150 is improved. As a result, a thinner reflective layer 150 may be formed that still provides sufficient reflective properties and visible light transmission. Additionally, the reduced thickness of the reflective layer 150 allows for less material to be used in each panel that is manufactured, thus improving manufacturing throughput and efficiency, increasing the usable life of the target (e.g., silver) used to form the reflective layer 150, and reducing overall manufacturing costs.

Further, the seed layer 140 can provide a barrier between the metal oxide layer 130 and the reflective layer 150 to reduce the likelihood of any reaction of the material of the reflective layer 150 and the oxygen in the lower metal oxide layer 130, especially during subsequent heating processes. As a result, the resistivity of the reflective layer 150 may be reduced, thus increasing performance of the reflective layer 150 by lowering the emissivity.

Formed on the reflective layer 150 is a barrier layer 160. The barrier layer 160 can include nickel, niobium, titanium, aluminum, chromium, and oxygen. For the silver layer to be as pure as possible, the layer immediately on top of the silver layer (e.g., the barrier layer) can be important in protecting the silver from oxidation, such as during oxygen reactive sputtering process in the deposition of subsequent layers. In addition, this barrier layer can protect the silver layer against reaction with oxygen diffusion during the glass tempering process, or during long term use where the piece of glass may be exposed to moisture or environment.

In addition to the oxygen diffusion barrier property, there are other desirable properties for the barrier layer. For example, since the barrier layer is placed directly on the silver layer, low or no solubility of the barrier material in silver is desirable to minimize reactivity between the barrier layer and silver at the interface. The reaction between the barrier layer and silver can introduce impurity to the silver layer, potentially reducing the conductivity.

In some embodiments, barrier structures can be formed on an infrared reflective layer to protect the infrared reflective layer from impurity diffusion, together with exhibiting good adhesion and good optical properties, for example, during the fabrication process.

Formed on the barrier layer 160 is an upper oxide layer 170, which can function as an antireflective film stack, including a single layer or multiple layers for different functional purposes. The antireflective layer 170 can serve to reduce the reflection of visible light, selected based on transmittance, index of refraction, adherence, chemical durability, and thermal stability. In some embodiments, the antireflective layer 170 includes tin oxide, offering high thermal stability properties. The antireflective layer 170 can also include titanium dioxide, silicon nitride, silicon dioxide, silicon oxynitride, niobium oxide, SiZrN, tin oxide, zinc oxide, or any other suitable dielectric material.

An upper protective layer 190 can be used for protecting the total film stack, for example, to protect the panel from physical or chemical abrasion. The upper protective layer 190 can be an exterior protective layer, such as silicon nitride, silicon oxynitride, titanium oxide, tin oxide, zinc oxide, niobium oxide, or SiZrN.

In some embodiments, adhesion layers can be used to provide adhesion between layers. The adhesion layers can be made of a metal alloy, such as nickel-titanium, and have a thickness of, for example, 30 Å.

Depending on the materials used, some of the layers of the low-e stack 105 may have some elements in common. An example of such a stack may use a zinc-based material in the oxide dielectric layers 130 and 170. As a result, a relatively low number of different targets can be used for the formation of the low-e stack 105.

Further, in the fabrication of low emissivity coating panels, high temperature processes can be used, for example, to anneal the deposited films or to temper the glass substrate. The high temperature processes can include heating at temperatures between 500 and 1000 C. The high temperature processes can have adverse effects on the low emissivity coating, such as changing the structure or the optical properties, e.g., index of refraction n or absorption coefficient k, of the coated films. Thus thermal stability with respect to optical properties is desirable, for example, barrier material might have low extinction coefficient, e.g., low visible absorption, in both metallic form and oxide form.

In some embodiments, the coating can include multiple infrared reflective stacks 107, such as a double or triple infrared reflective stacks with two or three infrared reflective silver layers.

In some embodiments, the effects of the deposition process of the layers deposited on the silver conductive layer on the quality of the silver conductive layer are disclosed. Since the silver conductive layer is desirably thin, for example, less than 20 nm, to provide high visible light transmission, the quality of the silver conductive layer can be affected by the deposition of the subsequently deposited layer, such as the barrier layer or the antireflective layer.

In some embodiments, sputter deposition processes, which can be applied for a barrier layer deposited on a conductive layer are disclosed. For example, the barrier layer can protect the infrared reflective layer from being oxidized. The oxide layer can function as an antireflective layer. The materials of the barrier layer can reduce reaction for the conductive underlayer such as oxidation, preventing resistivity and emissivity degradation.

In some embodiments, the alloy barrier layer can be sputtered from an alloyed target, or co-sputtered from different elemental targets onto the same substrate. The process may include oxygen to make the film oxidized, or may be in pure Ar (which will deposit a metallic barrier layer) followed by an exposure to an oxygen ambient, e.g., during a subsequent metal oxide layer deposition or a subsequent oxidation anneal process.

Figure 2A:
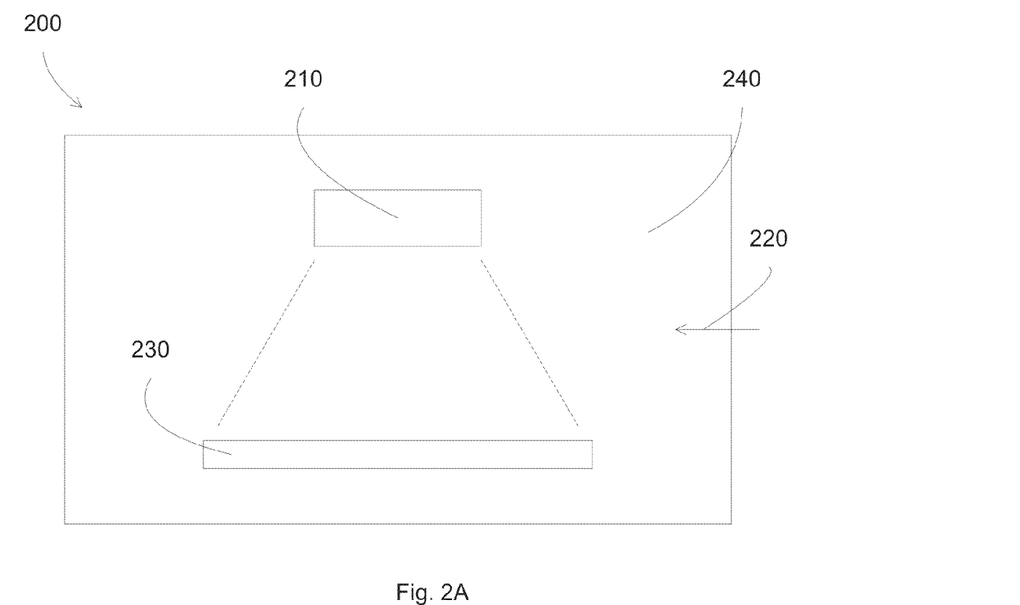
FIGS. 2A-2B illustrate physical vapor deposition (PVD) systems according to some embodiments.
Figure 2B:
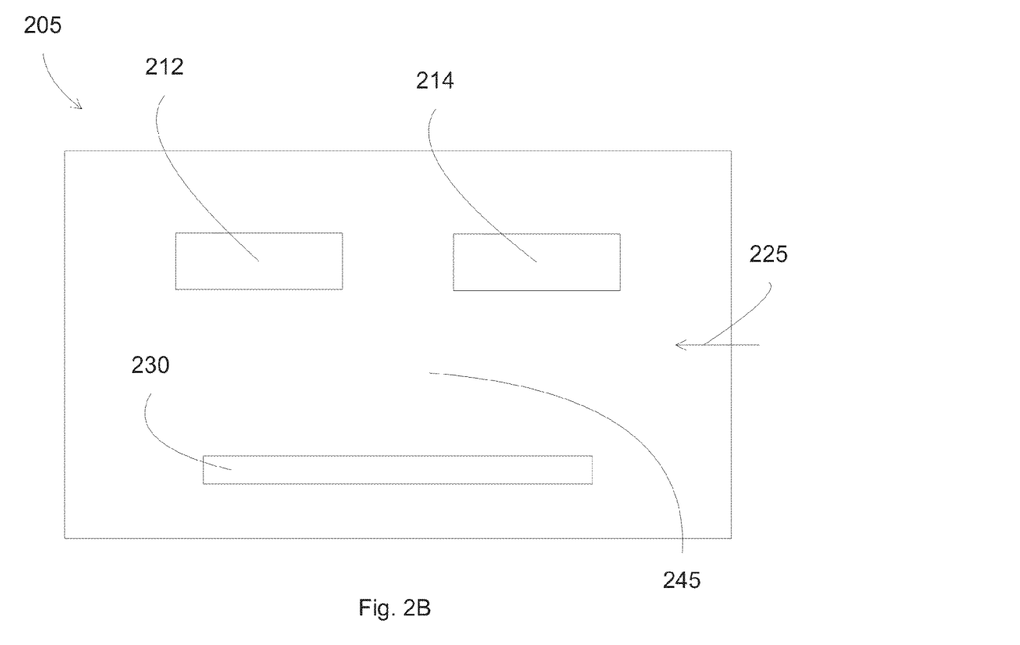

FIGS. 2A-2B illustrate physical vapor deposition (PVD) systems according to some embodiments. In FIG. 2A, a PVD system, also commonly called sputter system or sputter deposition system, 200 includes a housing that defines, or encloses, a processing chamber 240, a substrate 230, a target assembly 210, and reactive species delivered from an outside source 220. During deposition, the target is bombarded with argon ions, which releases sputtered particles toward the substrate 230. The sputter system 200 can perform blanket deposition on the substrate 230, forming a deposited layer that cover the whole substrate, e.g., the area of the substrate that can be reached by the sputtered particles generated from the target assembly 210.

The materials used in the target 210 may, for example, include nickel, niobium and titanium for barrier layer, silver for infrared reflective layer, and other metals for other layers. Additionally, the materials used in the targets may include oxygen, nitrogen, or a combination of oxygen and nitrogen in order to form the oxides, nitrides, and oxynitrides of the metals described above. The different targets can be used to deposit different layers in the low-e coatings, in addition to the barrier layer. Additionally, although only one target assembly 210 is shown, additional target assemblies may be used. As such, different combinations of targets may be used to form, for example, the dielectric layers described above. For example, in some embodiments in which the dielectric material is zinc-tin-oxide, the zinc and the tin may be provided by separate zinc and tin targets, or they may be provided by a single zinc-tin alloy target. A target assembly 210 can include a silver target, and together with argon ions to sputter deposit a silver layer on substrate 230. The target assembly 210 can include a metal or metal alloy target, and together with reactive species of oxygen to sputter deposit a metal alloy oxide layer.

The sputter deposition system 200 can include other components, such as a substrate support for supporting the substrate. The substrate support can include a vacuum chuck, electrostatic chuck, or other known mechanisms. The substrate support can be capable of rotating around an axis thereof that is perpendicular to the surface of the substrate. In addition, the substrate support may move in a vertical direction or in a planar direction. It should be appreciated that the rotation and movement in the vertical direction or planar direction may be achieved through known drive mechanisms which include magnetic drives, linear drives, worm screws, lead screws, a differentially pumped rotary feed through drive, etc.

In some embodiments, the substrate support includes an electrode which is connected to a power supply, for example, to provide a RF or DC bias to the substrate, or to provide a plasma environment in the process housing 240. The target assembly 210 can include an electrode which is connected to a power supply to generate a plasma in the process housing. The target assembly 210 is preferably oriented towards the substrate 230.

The sputter deposition system 200 can also include a power supply coupled to the target electrode. The power supply provides power to the electrodes, causing material to be sputtered from the target. During sputtering, inert gases, such as argon or krypton, may be introduced into the processing chamber 240 through the gas inlet 220. In embodiments in which reactive sputtering is used, reactive gases may also be introduced, such as oxygen and/or nitrogen, which interact with particles ejected from the targets to form oxides, nitrides, and/or oxynitrides on the substrate.

The sputter deposition system 200 can also include a control system (not shown) having, for example, a processor and a memory, which is in operable communication with the other components and configured to control the operation thereof in order to perform the methods described herein.

FIG. 2B shows a sputter system having co-sputtering targets according to some embodiments. A sputter deposition chamber 205 can include two targets 212 and 214 disposed in a plasma environment 245, containing reactive species delivered from an outside source 225. For example, the targets 212 and 214 can include the metal elements of the alloy oxide base layer, e.g., Zn and Sn, together with reactive species of oxygen to deposit an alloy of zinc-tin-oxide base layer on substrate 230. This configuration serves as an example, and other sputter system configurations can be used, such as a single target having an alloy material.

In some embodiments, methods and apparatuses for making low emissivity panels, including forming an infrared reflective layer formed under or over a barrier structure that includes an alloy of titanium aluminum oxide are disclosed. The panels can exhibit optimal infrared reflectance, improved color neutrality, thermal stability and durability, for example, due to the barrier layer protecting the infrared reflective layer while not degrading the low emissivity coating characteristics.

In some embodiments, methods for making low emissivity panels in large area coaters are disclosed. A transport mechanism can be provided to move a substrate under one or more sputter targets, to deposit a conductive layer underlayer before depositing a barrier layer, an antireflective layer, together with other layers such as a surface protection layer.

In some embodiments, in-line deposition systems, including a transport mechanism for moving substrates between deposition stations are disclosed.

Figure 3:
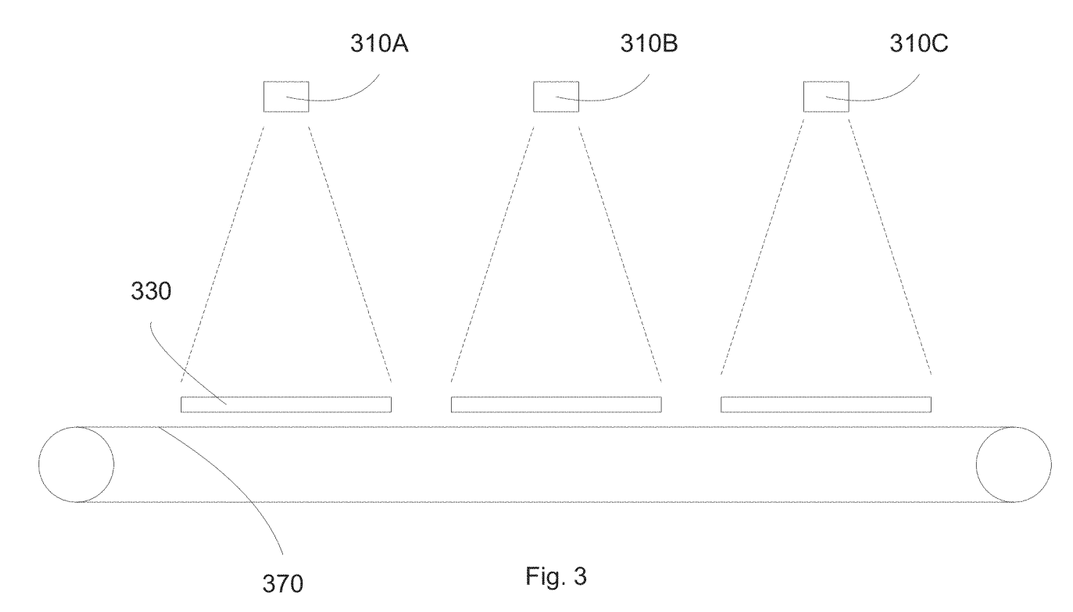
FIG. 3 illustrates an exemplary in-line deposition system according to some embodiments.

FIG. 3 illustrates an exemplary in-line deposition system according to some embodiments. A transport mechanism 370, such as a conveyor belt or a plurality of rollers, can transfer substrate 330 between different sputter deposition stations. For example, the substrate can be positioned at station #1, having a target assembly 310A, then transferred to station #2, having target assembly 310B, and then transferred to station #3, having target assembly 310C. The station #1 having target 310A can be a silver deposition station, sputtering an infrared reflective layer having silver. The station #2 having target 310B can be a barrier deposition station, sputtering a metallic oxide alloy. As shown, the station #2 includes a single target 310B. However, other configurations can be used, such as co-sputtering system utilizing two different targets. The station #3 having target 310C can be used to deposit other layers, such as an antireflective layer or a protection layer.

In some embodiments, methods, and coated panels fabricated from the methods, are disclosed to form multiple coatings, such as one or more infrared reflective layers, with minimal color change before and after heat treatments. The methods can include forming a top layer stack to cover the infrared reflective stacks, for example, to prevent interference between the coatings to improve the thermal stability, such as color resistance to thermal exposures. The top layer stack can include a silicon nitride layer on a zinc oxide layer on a zinc tin oxide layer.

Figure 4A:
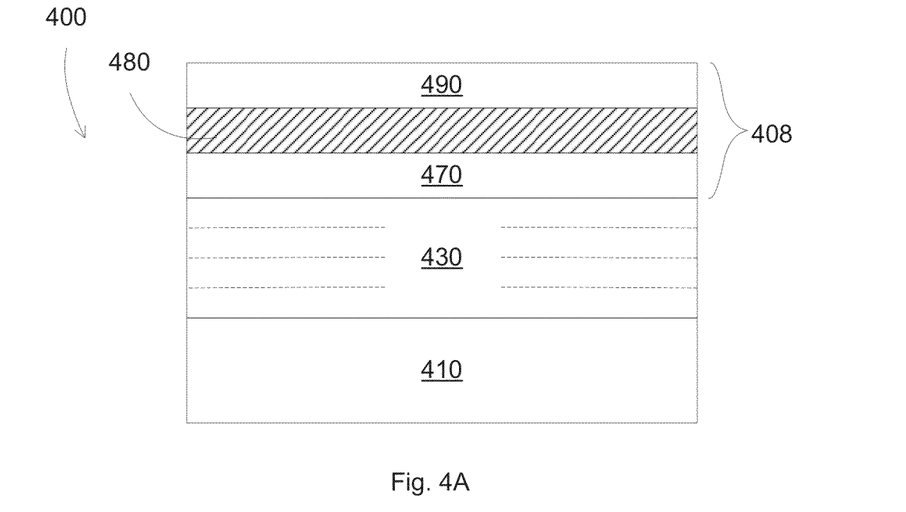
FIGS. 4A-4B illustrate different configurations for forming low emissivity stacks according to some embodiments.
Figure 4B:
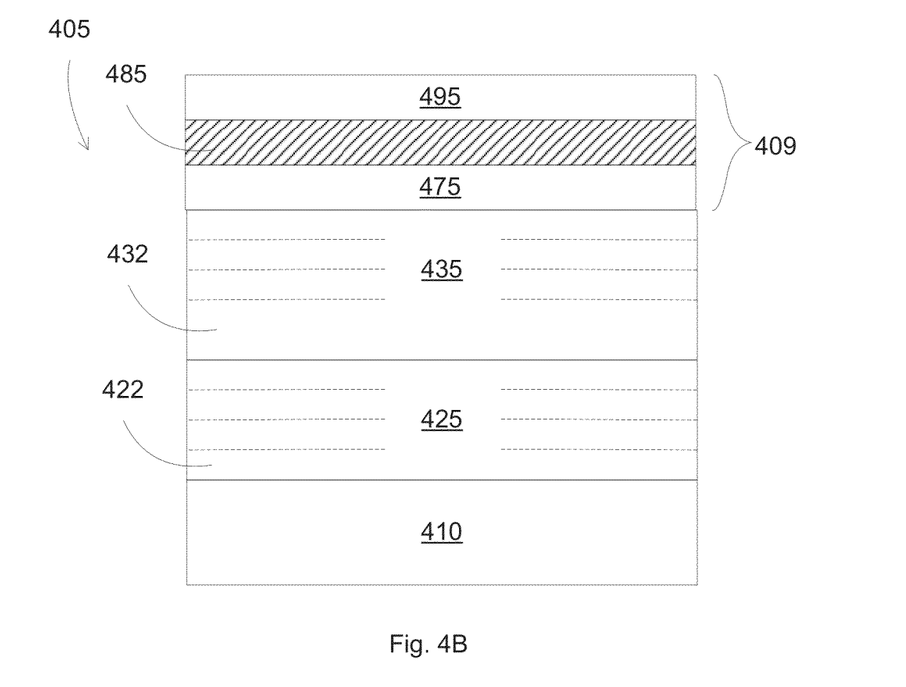

FIGS. 4A-4B illustrate different configurations for forming low emissivity stacks according to some embodiments. In FIG. 4A, a low emissivity stack 400 includes a top layer stack 408 acting to cover and/or protect the infrared reflective stack 430, which is formed on a substrate 410. The top layer stack 408 can include a zinc tin oxide layer 470, a zinc oxide 480, and a silicon nitride 490. The infrared reflective stack 430 can include a base layer, a seed layer, a silver layer, and a barrier layer.

In some embodiments, the zinc tin oxide layer 470 can include a zinc tin oxide alloy, such as $Zn_2SnO_x$, with x less than or equal to about 4. The thickness of the zinc tin oxide layer 470 can be between 2 and 30 nm, such as 6 nm. The thickness of the zinc oxide layer 480 can be between 2 and 8 nm, such as 4 nm, e.g., sufficient to reduce any interaction between the top silicon nitride layer 490 and the bottom zinc tin oxide layer 470. The thickness of the silicon nitride layer can be between 10 and 30 nm, such as 20 nm.

In some embodiments, the top triple layer stack 408 can be used to replace a top double layer stack of silicon nitride on zinc tin oxide. The combined thickness of the zinc oxide layer and the zinc tin oxide layer in the top triple layer stack 408 can be similar to the thickness of the zinc tin oxide layer in the top double layer stack.

In FIG. 4B, a low emissivity stack 405 can include top layer stack 409 acting to cover and/or protect two adjacent infrared reflective stacks 425 and 445, which are formed on a substrate 415. The top layer stack 409 can include a zinc tin oxide layer 475, a zinc oxide 485, and a silicon nitride 495. The infrared reflective stacks 425 and 435 each can include a base layer, a seed layer, a silver layer, and a barrier layer. The base layer 432 of the infrared reflective stack 435 can be formed of the same material as the bottom layer 475 of the top layer stack 409, e.g., $Zn_2SnO_x$. The base layer 432 can also act as a separation layer between the two infrared reflective stacks 425 and 435, for example, to prevent any interaction between the two infrared reflective stacks. The base layer 432 can be thicker than the base layer 422 for the infrared reflective stack 425, for example, thicker by a thickness that can be sufficient to prevent interaction at a high temperature heat treatment process. The temperature of the heat treatment process can be between 500 and 1000 C.

In some embodiments, the infrared reflective stacks can include a base layer of $Zn_2SnO_x$, a seed layer such as ZnO, an infrared reflective layer such as silver, and a barrier layer of a Ni—Nb alloy.

In some embodiments, the low emissivity stack can include Ni—Nb alloy barrier layers for the infrared reflective stacks. For example, the Ni—Nb alloy barrier layers can include nickel niobium oxide, together with an addition element of titanium, aluminum, or chromium. As an example, the barrier layer can include a $NiNbTiO_x$ layer with x between 10 and 30 at %. The top layer stack 408/409 and the Ni—Nb alloy barrier can provide improved thermal stability, especially in maintaining similar color of the coated layers before or after a heat treatment process.

Figure 5A:
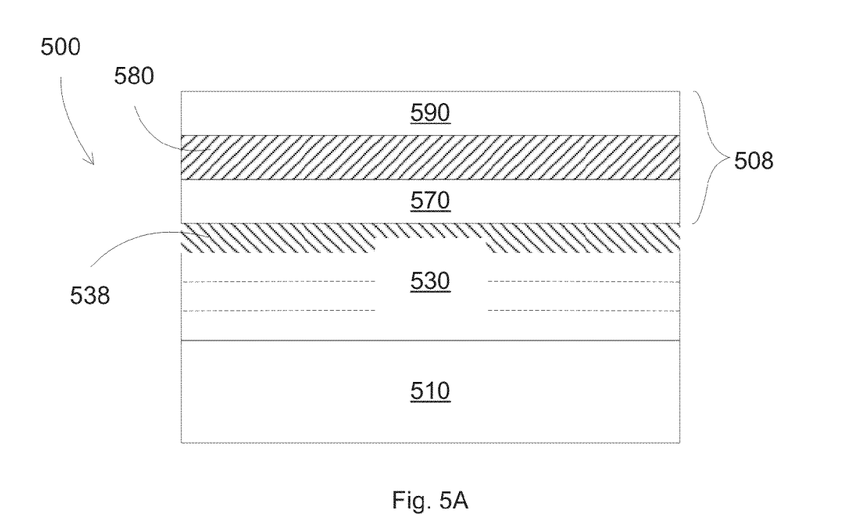
FIGS. 5A-5B illustrate different configurations for forming low emissivity stacks according to some embodiments.
Figure 5B:
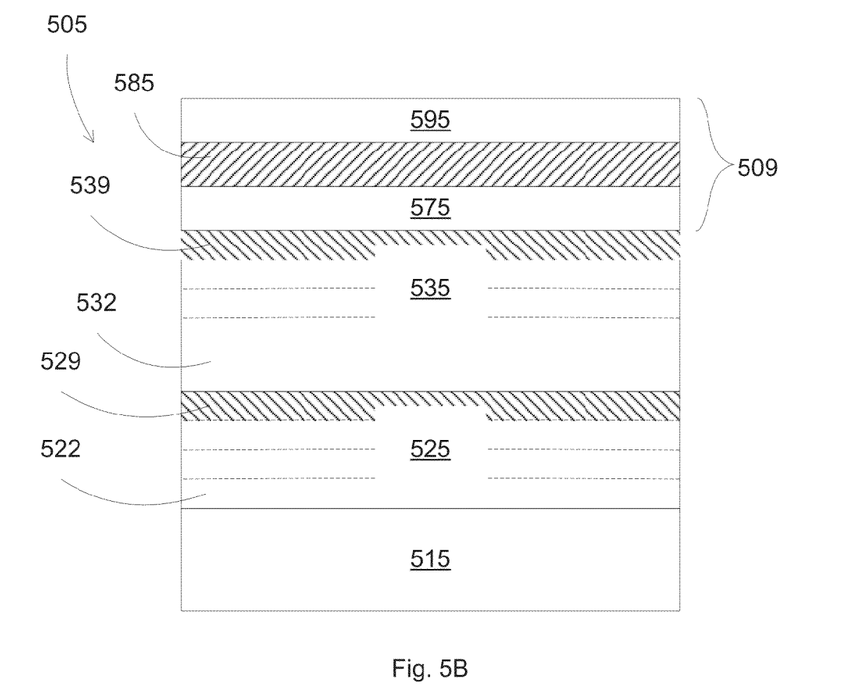

FIGS. 5A-5B illustrate different configurations for forming low emissivity stacks according to some embodiments. In FIG. 5A, a low emissivity stack 500 includes a top layer stack 508 acting to cover and/or protect the infrared reflective stack 530, which is formed on a substrate 510. The top layer stack 508 can include a zinc tin oxide layer 570, a zinc oxide 580, and a silicon nitride 590. The infrared reflective stack 530 can include a base layer, a seed layer, a silver layer, and a barrier layer 538. The barrier layer 538 of the infrared reflective stack 530 can include a Ni—Nb alloy, such as NiNbTiO$_x$, with x between 10 and 30 at %.

The zinc tin oxide layer 570 can include a zinc tin oxide alloy, such as Zn$_2$SnO$_x$, with x less than or equal to about 5. The thickness of the zinc tin oxide layer 570 can be between 2 and 30 nm, such as 6 nm. The thickness of the zinc oxide layer 580 can be between 2 and 8 nm, such as 4 nm, e.g., sufficient to reduce any interaction between the top silicon nitride layer 590 and the bottom zinc tin oxide layer 570. The thickness of the silicon nitride layer can be between 10 and 30 nm, such as 20 nm.

In FIG. 5B, a low emissivity stack 505 can include top layer stack 509 acting to cover and/or protect two adjacent infrared reflective stacks 525 and 545, which are formed on a substrate 515. The top layer stack 509 can include a zinc tin oxide layer 575, a zinc oxide 585, and a silicon nitride 595. The infrared reflective stacks 525 and 535 each can include a base layer, a seed layer, a silver layer, and a barrier layer. The base layer 532 of the infrared reflective stack 535 can be formed of the same material as the bottom layer 575 of the top layer stack 509, e.g., Zn$_2$SnO$_x$. The base layer 532 can also act as a separation layer between the two infrared reflective stacks 525 and 535, for example, to prevent any interaction between the two infrared reflective stacks. The base layer 532 can be thicker than the base layer 522 for the infrared reflective stack 525, for example, thicker by a thickness that can be sufficient to prevent interaction at a high temperature heat treatment process. The thickness of the Zn$_2$SnO$_x$ separation layer 535 can be between 40 and 90 nm. The thickness of the Zn$_2$SnO$_x$ base layer 542 can be between 10 and 40 nm. The thickness of the base layer 543 can be the sum of thicknesses of the separation layer 530 and of the base layer 542, such as between 50 and 100 nm.

The barrier layer 539/529 of the infrared reflective stacks 535/525 can include a Ni—Nb alloy, such as NiNbTiO$_x$, with x between 10 and 30 at %. The thickness of the NiNbTiO$_x$ barrier layer 539/529 can be between 1 and 5 nm. The combination of the top layer stack 509 and the NiNbTiO$_x$ barrier layers 539/529 can improve the thermal stability of the coated layers, in addition to high visible light transmission and high light to solar gain.

In some embodiments, a low emissivity stack is provided, which can have high visible light transmission, high light to solar gain, color neutral, and highly resistant to thermal cycles. The low emissivity stack can include a layer of lower protection, such as silicon nitride, on a glass substrate. The thickness of the silicon nitride can be between 10 and 30 nm. On the silicon nitride layer is a first infrared reflective stack, including a barrier layer, such as NiNbTiO$_x$, on an infrared reflective layer, such as silver, on a seed layer, such as ZnO, on a base layer, such as Zn$_2$SnO$_x$. The thickness of the NiNbTiO$_x$ barrier layer can be between 1 and 5 nm. The thickness of the silver layer can be between 8 and 12 nm. The thickness of the ZnO seed layer can be between 3 and 10 nm. The thickness of the Zn$_2$SnO$_x$ base layer can be between 10 and 40 nm. On the first infrared reflective stack is a second infrared reflective stack, including a barrier layer, such as NiNbTiO$_x$, on an infrared reflective layer, such as silver, on a seed layer, such as ZnO, on a base layer, such as Zn$_2$SnO$_x$. The thickness of the NiNbTiO$_x$ barrier layer can be between 1 and 5 nm. The thickness of the silver layer can be between 14 and 18 nm. The thickness of the ZnO seed layer can be between 3 and 10 nm. The thickness of the Zn$_2$SnO$_x$ base layer can be between 50 and 100 nm. The base layer of the second infrared reflective stack can also functioned as a separation layer, separating the first and second infrared reflective stacks. On the second infrared reflective stack is top layer stack, which can include a zinc tin oxide layer, such as Zn$_2$SnO$_x$, a zinc oxide layer, such as ZnO, and a silicon nitride layer. The thickness of the Zn$_2$SnO$_x$ layer can be between 2 and 30 nm. The thickness of the ZnO layer can be between 1 and 10 nm. The thickness of the silicon nitride can be between 10 and 30 nm.

Figure 6:
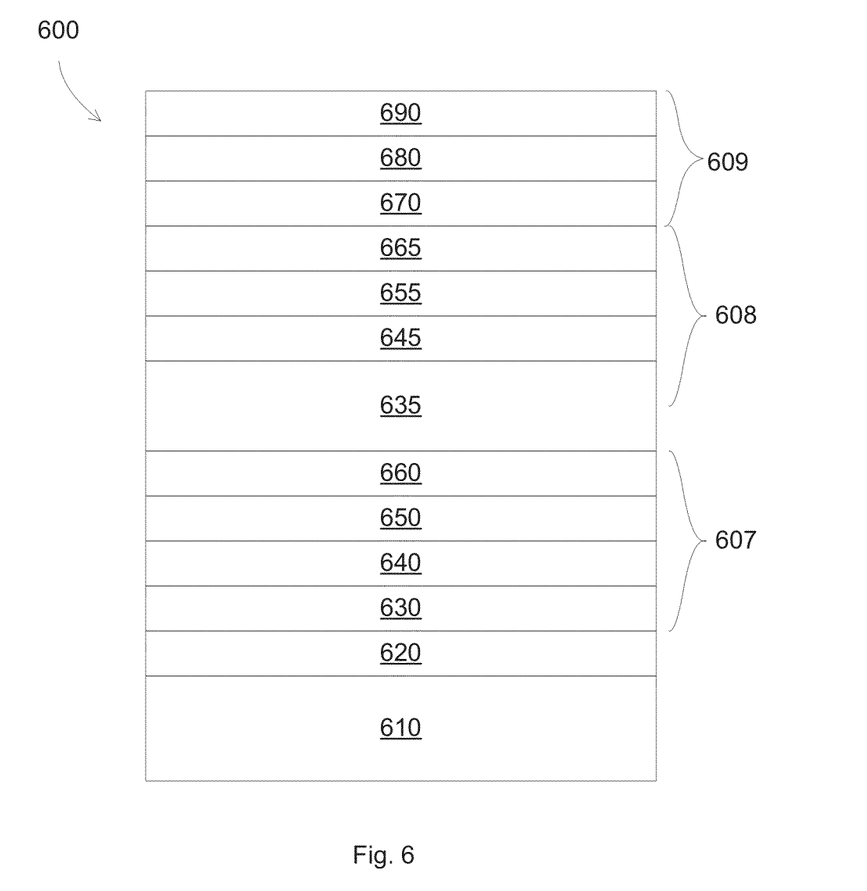
FIG. 6 illustrates a low emissivity stack according to some embodiments.

FIG. 6 illustrates a low emissivity stack according to some embodiments. A low emissivity stack 600 includes a glass substrate 610. A 14 nm silicon nitride layer 620 is formed on the substrate 610. A 12 nm Zn$_2$SnO$_x$ base layer 630 is formed on the silicon nitride layer. The Zn$_2$SnO$_x$ base layer 630 has an oxygen concentration of 50 at %. A 4 nm ZnO seed layer 640 is formed on the base layer 630. A 9 nm silver layer 650 is formed on the seed layer 640. A 2.4 nm NiNbTiO$_x$ barrier layer 660 is formed on the silver layer 650. The NiNbTiO$_x$ barrier layer 660 has an oxygen concentration of 20 at %. The base layer 630, the seed layer 640, the silver layer 650, and the barrier 660 form a first infrared reflective stack 607. An 74 nm Zn$_2$SnO$_x$ base layer 635 is formed on the barrier layer 660. The Zn$_2$SnO$_x$ base layer 635 has an oxygen concentration of 50 at %. A 4 nm ZnO seed layer 645 is formed on the base layer 635. A 14 nm silver layer 655 is formed on the seed layer 645. A 2.4 nm NiNbTiO$_x$ barrier layer 665 is formed on the silver layer 655. The NiNbTiO$_x$ barrier layer 665 has an oxygen concentration of 20 at %. The base layer 635, the seed layer 645, the silver layer 655, and the barrier 665 form a second infrared reflective stack 608. A 6 nm Zn$_2$SnO$_x$ oxide layer 670 is formed on the barrier layer 665. The Zn$_2$SnO$_x$ protective oxide layer 670 has an oxygen concentration of 50 at %. A 3 nm ZnO oxide layer 680 is formed on the barrier layer 665. A 20 nm silicon nitride layer 690 is formed on the protective oxide layer 670. The Zn$_2$SnO$_x$ oxide layer 670, the ZnO layer 680, and the silicon nitride layer 690 form a top layer stack 609. The low emissivity stack was exposed to a heat treatment at 680° C. for 10 minutes.

Figure 7:
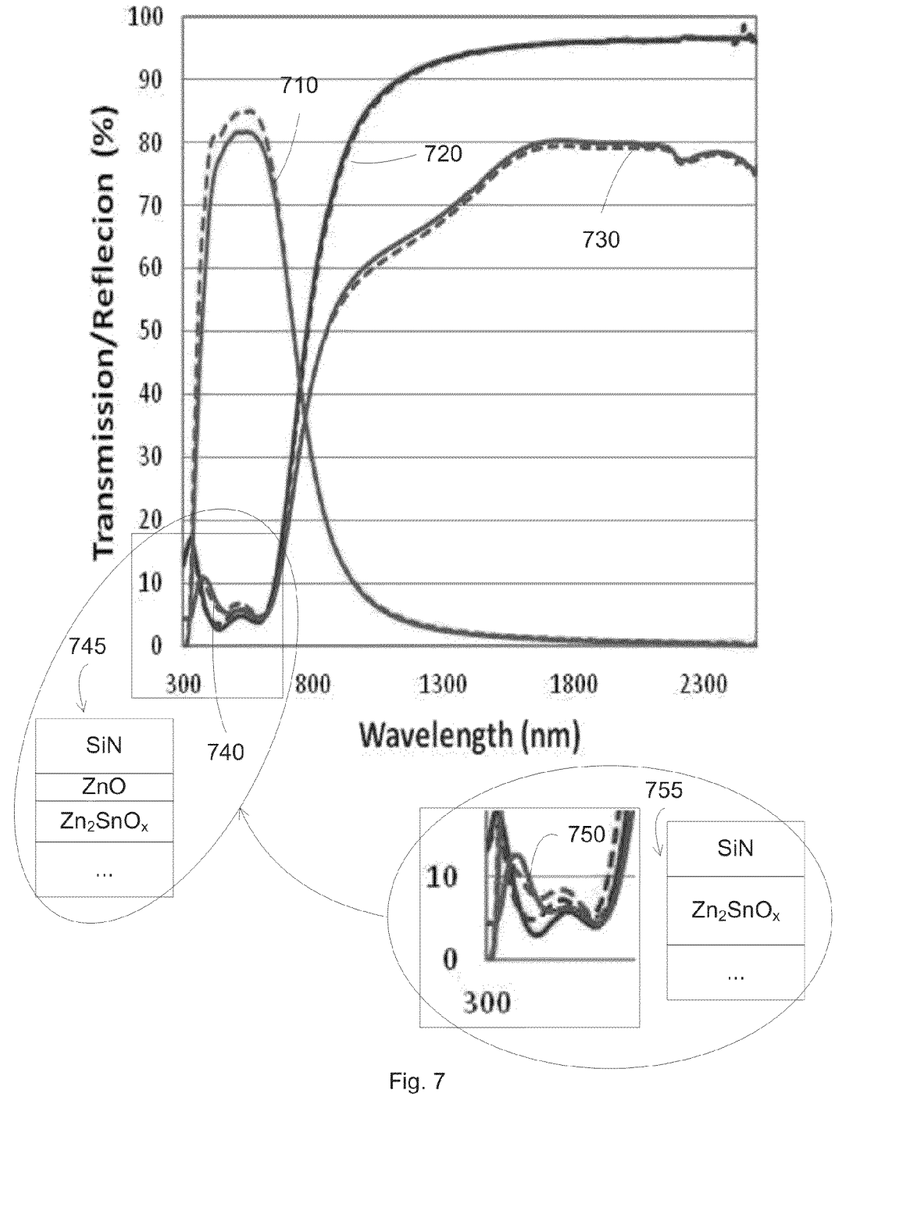
FIG. 7 illustrates the transmission and reflection of the low emissivity stack before and after a high temperature heat treatment according to some embodiments.

Optical can color properties of the low emissivity stack were measured before and after the heat treatment. FIG. 7 illustrates the transmission and reflection of the low emissivity stack before and after a high temperature heat treatment according to some embodiments. The solid and dashed curves 710 show the transmission response through the low emissivity stack. High transmission, e.g., maximum above 80%, can be achieved for the visible light range, e.g., between 400 and 750 nm. The solid and dashed curves 720 show the reflection response from the coating side. Low reflection, e.g., minimum below 5%, can be achieved for the visible light range, e.g., between 400 and 750 nm. High reflection, e.g., maximum above 90%, can be achieved for the infrared range, e.g., between 800 and 2300 nm. The solid and dashed curves 730 show the reflection response from the glass side. Low reflection, e.g., minimum below 5%, can also be achieved for the visible light range, e.g., between 400 and 750 nm. High reflection, e.g., maximum above 80%, can be achieved for the infrared range, e.g., between 800 and 2300 nm.

The solid curves represent the optical spectra for the as-coated low emissivity stack. The dashed curves represent the optical spectra for the high temperature heat treated low emissivity stack. As can be seen, there is minimum difference between the optical spectra of the transmission and reflection of the low emissivity stack before and after the heat treatment.

FIG. 7 further includes a portion of the optical spectra for the as-coated (solid) and heat-treated (dashed) low emissivity control stack of SiN/Zn$_2$SnO$_x$. Improvements of the SiN/ZnO/Zn$_2$SnO$_x$ top layer stack 745, as compared to SiN/Zn$_2$SnO$_x$ top layer stack 755 can also be seen, especially at the reflection response from the glass side 730. The reflection response from the glass side 740 of the SiN/ZnO/Zn$_2$/SnO$_x$ top layer stack 745 shows smaller values in the visible light frequency of 300 to 650 nm as compared to the response 750 of the SiN/Zn$_2$SnO$_x$ top layer stack 755. The improvements include color values for the as-coated and heat-treated coatings, in addition to the color changes between as-coated and heat-treated coatings for the SiN/ZnO/Zn$_2$/SnO$_x$ top layer stack 745.

Other characteristics of the low emissivity stack are shown in the following table. As-coated represents data for the as-coated low emissivity stack. Heat-treated represents data for the low emissivity stack after the high temperature treatment.

Intensity of reflected visible wavelength light, e.g., "reflectance" is defined for glass side "g" or for film side "f". Intensity from glass side reflectance, e.g., $R_gY$, shows light intensity measured from the side of the glass substrate opposite the side of the coated layers. Intensity from film side reflectance, e.g., $R_fY$, shows light intensity measured from the side of the glass substrate on which the coated layers are formed. For transmittance, e.g., TY, shows light intensity measured for the transmitted light.

Color characteristics are measured and reported herein using the CIE LAB L*, a*, b* coordinates and scale (i.e. the CIE L*a*b* diagram, Ill. CIE-C, 2 degree observer). In the CIE LAB color system, L* value indicates the lightness of the color, a* indicates the position between magenta and green (more negative values indicate stronger green and more positive values indicate stronger magenta), and b* indicates the position between yellow and blue (more negative values indicate stronger blue and more positive values indicate stronger yellow).

Data are also shown for the difference between heat treated and as-coated low emissivity stacks. The value ΔE* (and Δa*, Δb*, ΔY) are important in determining whether or not upon heat treatment (HT) there is matchability, or substantial matchability, of the coated panels. For purposes of example, the term Δa*, for example, is indicative of how much color value a* changes due to heat treatment. Also, ΔE* is indicative of the change in reflectance and/or transmittance (including color appearance) in a coated panel after a heat treatment. ΔE* corresponds to the CIELAB Scale L*, a*, b*, and measures color properties before heat treatment ($L_0^*$, $a_0^*$, $b_0^*$) and color properties after heat treatment ($L_1^*$, $a_1^*$, $b_1^*$):

$$\Delta E^* = \sqrt{(\Delta L^*)^2 + (\Delta a^*)^2 + (\Delta b^*)^2}$$

where:

$$\Delta L^* = L_1^* - L_0^*$$

$$\Delta a^* = a_1^* - a_0^*$$

$$\Delta b^* = b_1^* - b_0^*$$

The color change of glass side reflection can be calculated as $R_g \Delta E^*$. The color change of light transmission can be calculated as T ΔE*, T|Δa*| and T|Δb*|. The luminance change of light transmission can be calculated as T ΔY.

Solar Heat Gain Coefficient (SHGC) is defined as the fractional amount of the solar energy that strikes the window that ends up warming the house. Light to Solar Gain (LSG) is defined as the ratio of visible light transmission to solar heat gain coefficient.

TABLE 1

Measured data for as-coated and heat-treated stacks

| | | Without ZnO | | With ZnO | |
|---|---|---|---|---|---|
| | | As-coated | Heat-treated | As-coated | Heat-treated |
| Transmission | TY | 79.59 | 80.92 | 80.41 | 83.68 |
| | TL* | 91.5 | 92.1 | 91.87 | 93.31 |
| | Ta* | −3.16 | −2.15 | −3.56 | −3.45 |
| | Tb* | 2.13 | 1.39 | 1.38 | 1.09 |
| Reflection (glass side) | RgY | 5.68 | 7.02 | 5.41 | 5.91 |
| | RgL* | 28.6 | 31.86 | 27.87 | 29.17 |
| | Rga* | −0.73 | −4.74 | 1.48 | −1.25 |
| | Rgb* | −5.06 | −2.68 | −2.58 | −0.36 |
| Reflection (film side) | RfY | 5.02 | 6.43 | 4.72 | 5.46 |
| | RfL* | 26.79 | 30.47 | 25.93 | 28 |
| | Rfa* | −5.74 | 0.47 | 1.94 | −0.24 |
| | Rfb* | 8.47 | 3.91 | 7.54 | 6.45 |
| Absorption | | 15.39 | 12.65 | 14.87 | 14.87 |
| LSG | | 1.89 | 1.87 | 1.9 | 1.92 |
| Rf ΔE* | | 8.538 | | 3.198 | |
| Rg ΔE* | | 5.96 | | 3.751 | |
| T ΔE* | | 1.388 | | 1.473 | |
| T |Δb*| | | 0.74 | | 0.29 | |
| T ΔY | | 1.33 | | 3.27 | |

As can be seen from Table 1, the above low emissivity stack design can show a visible transmittance (TY %) of about 70-80%, a reflectance value (at glass side $R_gY$ or film side $R_fY$) of about 5.5-6.6%, and a desirable color neutral (low values of a* and b*). The above low emissivity stack design can also achieved high LSG value.

Since low-e glass was coated in the double panel, the glass side reflection color can be important (viewers in most applications predominantly view the products from the glass side), together with the transmittance color. The color changes are small, and such small color change cannot tell by human eyes, so that the above low emissivity stack can be used in single production solution (SPS) for as-coated and heat-treated products.

Further shown is the improvements of the SiN/ZnO/Zn$_2$/SnO$_x$ top layer stack (labeled as "With ZnO") as compared to the SiN/Zn$_2$SnO$_x$ top layer stack (labeled as "Without ZnO"). Visible light transmission was improved by about 1%. Reflection color shift, e.g., the difference between heat-treated and as-coated stack, was nearly cut in half.

Figure 8:
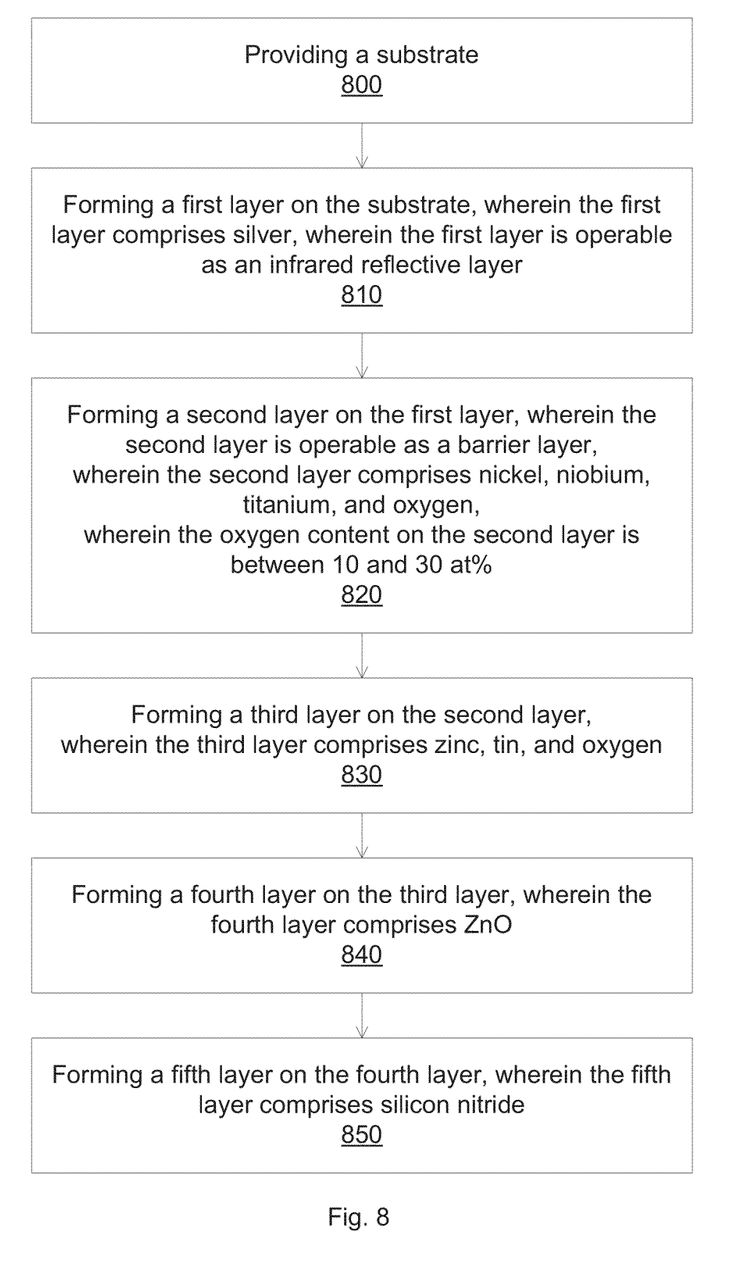
FIG. 8 illustrates a flow chart for sputtering coated layers according to some embodiments.

FIG. 8 illustrates a flow chart for sputtering coated layers according to some embodiments. One or more infrared reflective silver layers are formed on a substrate, together with a top layer stack. The top layer stack can include a silicon nitride layer on a zinc oxide layer on a zinc tin oxide layer. In addition, a NiNb alloy can be used as a barrier layer for the silver layers.

In operation 800, a substrate is provided. The substrate can be a transparent substrate, such as a glass substrate or a polymer substrate. Other substrates can also be used. In operation 810, a first layer is formed on the substrate. The first layer can be operable as an infrared reflective layer. The first layer can include a conductive material or a metallic material such as silver. The thickness of the first layer can be less than or equal to about 20 nm, or can be less than or equal to about 10 nm.

In operation 820, a second layer is sputter deposited on the first layer. The second layer can be operable as a barrier layer. The second layer can include an oxide alloy of zinc, tin and titanium. The oxygen content of the barrier layer can be between 10 and 30 at %.

In some embodiments, one or more underlayers can be formed under the first layer, for example, a protection layer of silicon nitride, a base layer of zinc tin oxide, and a seed layer of ZnO.

In operation 830, a third layer is sputter deposited on the second layer. The third layer can include an oxide alloy of zinc and tin, such as $Zn_2SnO_x$, with x less than 4. The thickness of the separation layer can be between 2 and 20 nm.

In operation 840, a fourth layer is formed on the third layer. The fourth layer can be operable as a separation layer for the third layer and the to-be-deposited fifth layer. The fourth layer can include zinc oxide. The thickness of the fourth layer can be between 1 and 10 nm.

In operation 850, a fifth layer is formed on the fourth layer. The fifth layer can be operable as a coating protection layer. The fifth layer can include silicon nitride. The thickness of the fifth layer can be between 10 and 30 nm.

Figure 9:
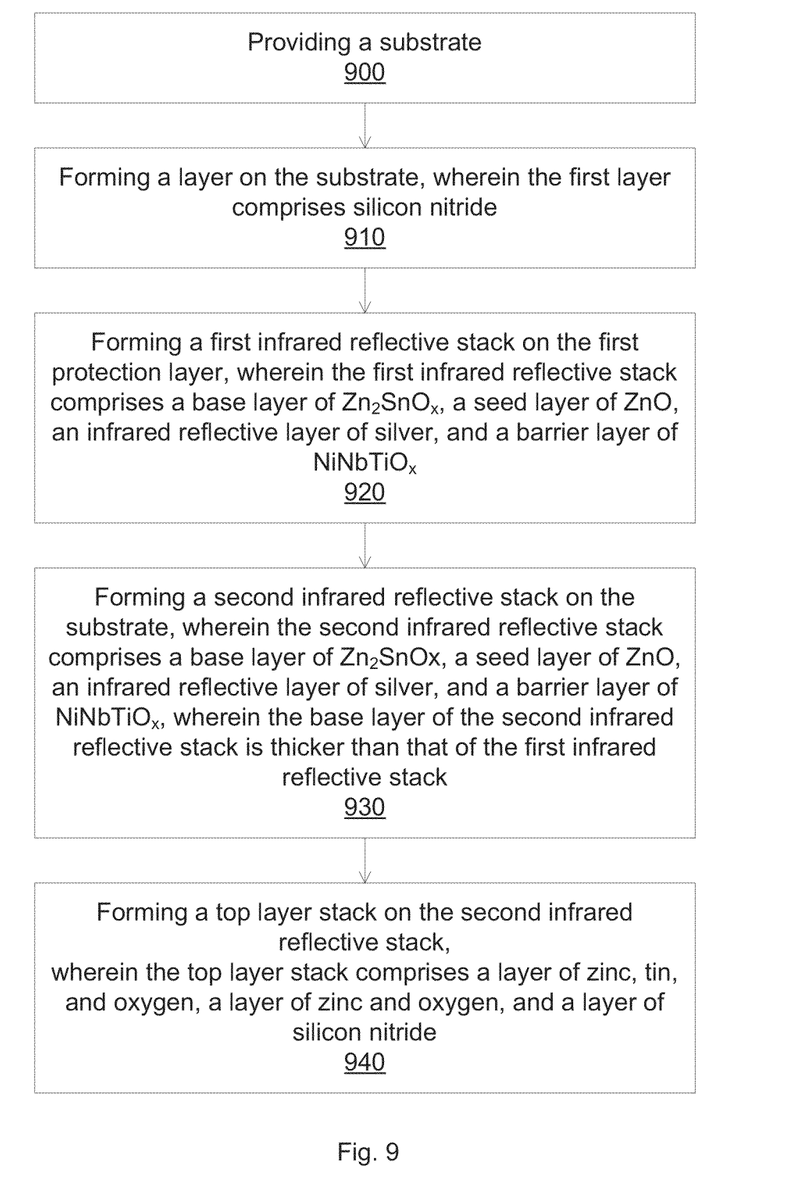
FIG. 9 illustrates a flow chart for sputtering coated layers according to some embodiments.

FIG. 9 illustrates a flow chart for sputtering coated layers according to some embodiments. Two or more infrared reflective stacks are formed sequentially on a substrate, in which a base layer of the top infrared reflective stack is thicker than the base layer of the bottom infrared reflective stack. The base layer can include a zinc tin oxide alloy. In addition, a NiNb alloy can be used as a barrier layer for the silver layers. Further a top layer stack can be formed on the infrared reflective stacks. The top layer stack can include a silicon nitride layer on a zinc oxide layer on a zinc tin oxide layer.

In operation 900, a substrate is provided. The substrate can be a transparent substrate, such as a glass substrate or a polymer substrate. Other substrates can also be used. In operation 910, a layer is formed on the substrate. The layer can include silicon nitride, with a thickness between 10 and 30 nm. In some embodiments, the first layer can be optional.

In operation 920, a first infrared reflective stack is formed on the first protection layer. The first infrared reflective stack can include a base layer of $Zn_2TiO_x$, a seed layer of ZnO, an infrared reflective layer of silver, and a barrier layer of $NiNbTiO_x$. The $Zn_2TiO_x$ base layer can have x less than 4, with a thickness between 10 and 40 nm. The ZnO seed layer can have a thickness between 3 and 10 nm. Ag layer can have a thickness between 8 and 12 nm. The $NiNbTiO_x$ barrier layer can have an oxygen content between 10 and 30 at %, with a thickness between 1 and 5 nm.

In operation 930, a second infrared reflective stack is formed on the first infrared reflective stack. The second infrared reflective stack can include a base layer of $Zn_2TiO_x$, a seed layer of ZnO, an infrared reflective layer of silver, and a barrier layer of $NiNbTiO_x$. The $Zn_2TiO_x$ base layer can have x less than 4, with a thickness between 50 and 100 nm. The ZnO seed layer can have a thickness between 3 and 10 nm. Ag layer can have a thickness between 14 and 18 nm. The $NiNbTiO_x$ barrier layer can have an oxygen content between 10 and 30 at %, with a thickness between 1 and 5 nm.

In operation 940, a top layer stack is formed on the second infrared reflective stack. The top layer stack can include a layer of $Zn_2SnO_x$, with x less than 4, and with a thickness between 2 and 20 nm. The top layer stack can include a layer of ZnO, with a thickness between 1 and 10 nm. The top layer stack can include a layer of silicon nitride, with a thickness between 10 and 30 nm.

Although the foregoing examples have been described in some detail for purposes of clarity of understanding, the invention is not limited to the details provided. There are many alternative ways of implementing the invention. The disclosed examples are illustrative and not restrictive.

What is claimed is:

1. A coated article comprising
   first layer disposed on a substrate,
      wherein the first layer comprises $Zn_2SnO_x$
      wherein the first layer is operable as a base layer and has a thickness of 12 nm;
   a second layer disposed on the first layer,
      wherein the second layer comprises silver,
      wherein the second layer is operable as an infrared reflective layer;
   a third layer disposed on the second layer,
      wherein the third layer comprises nickel, niobium, titanium and oxygen,
      wherein the third layer is operable as a barrier layer;
   a fourth layer disposed on the third layer,
      wherein the fourth layer comprises zinc tin oxide in contact with the third layer and has a thickness between 50 nm and 100 nm;
   a fifth layer disposed on the fourth layer,
      wherein the fifth layer comprises silver,
      wherein the fifth layer is operable as an infrared reflective layer;
   a sixth layer on the fifth layer,
      wherein the sixth layer comprises nickel, niobium, titanium and oxygen,
      wherein the sixth layer is operable as a barrier layer;
   a seventh layer disposed on the sixth layer,
      wherein the seventh layer comprises $Zn_2SnO_x$ and has a thickness between 2 nm and 30 nm;
   an eighth layer on the seventh layer,
      wherein the eighth layer is made of zinc oxide and has a thickness between 1 nm and 10 nm; and
   a ninth layer on the eighth layer
      wherein the ninth layer comprises silicon nitride,
      wherein the transmission of the coated article is greater than 80% and the reflection of the heat treated coated article is less than 6%.

2. A coated article as in claim 1 wherein the color change of the coated article after an anneal at a temperature above 600 C is less than 4.

3. A coated article as in claim 1 wherein the fourth layer comprises $Zn_2SnO_x$.

4. A coated article as in claim 1 wherein the thickness of the fourth layer is 74 nm, and the thickness of the seventh layer is 6 nm.

5. A coated article as in claim 1 wherein the thickness of the eighth layer is 3 nm.

6. A coated article as in claim 1 wherein the third layer and the sixth layer comprise $NiNbTiO_x$, wherein the $NiNbTiO_x$ has an oxygen concentration of between 10 and 30 at %.

7. A coated article as in claim 1 wherein a thickness of the second layer is between 8 nm and 12 nm, and a thickness of the fifth layer is between 14 nm and 18 nm.

8. A coated article as in claim 1 further comprising an tenth layer between the first and second layers and an eleventh layer between the fourth and fifth layers, wherein the tenth layer comprises zinc oxide, wherein the tenth layer is operable as a seed layer for the second layer, wherein the eleventh layer comprises zinc oxide, wherein the eleventh layer is operable as a seed layer for the fifth layer, wherein the thicknesses of the tenth layer and the eleventh layer are between 3 and 10 nm.

9. A coated article comprising:
   a first layer formed above a substrate,
      wherein the first layer comprises $Zn_2SnO_x$ and has a thickness of 12 nm;
   a second layer formed above the first layer,
      wherein the second layer comprises zinc and oxygen and has a thickness between 3 nm and 10 nm;

a third layer formed above the second layer,
  wherein the third layer comprises silver and has a thickness between 8 nm and 12 nm;
a fourth layer formed above the third layer,
  wherein the fourth layer comprises nickel, niobium, titanium and oxygen and has a thickness between 1 nm and 5 nm;
a fifth layer formed above the fourth layer,
  wherein the fifth layer comprises zinc tin oxide in contact with the fourth layer and has a thickness between 50 nm and 100 nm;
a sixth layer formed above the fifth layer,
  wherein the sixth layer comprises zinc and oxygen and has a thickness between 3 nm and 10 nm;
a seventh layer formed above the sixth layer,
  wherein the seventh layer comprises silver and has a thickness between 14 nm and 18 nm;
an eighth layer formed above the seventh layer,
  wherein the eighth layer comprises nickel, niobium, titanium and oxygen and has a thickness between i nm and 5 nm;
a ninth layer formed above the eighth layer,
  wherein the ninth layer comprises $Zn_2SnO_x$ and has a thickness between 2 nm and 30 nm; and
a tenth layer formed above the ninth layer,
  wherein the tenth layer comprises zinc and oxygen and has a thickness between 1 nm and 10 nm,
wherein the transmission of the coated article is greater than 80% and the reflection of the heat treated coated article is less than 6%.

10. A coated article as in claim 9 wherein the thickness of the fifth layer is 74 nm and the thickness of the ninth layer is 6 nm.

11. A coated article as in claim 10 wherein the thickness of the second layer is 4 nm, the thickness of the sixth layer is 4 nm, and the thickness of the tenth layer is 3 nm.

12. A coated article as in claim 11 wherein the thickness of the third layer is 9 nm, and the thickness of the seventh layer is 14 nm.

13. A coated article as in claim 12 wherein the thickness of the fourth layer is 2.4 nm, and the thickness of the eighth layer is 2.4 nm.

14. A coated article as in claim 13 further comprising:
an eleventh layer formed between the substrate and the first layer, wherein the eleventh layer comprises silicon nitride and has a thickness between 10 nm and 30 nm; and
a twelfth layer formed above the eleventh layer, wherein the twelfth layer comprises silicon nitride and has a thickness between 10 nm and 30 nm.

15. A coated article as in claim 9 wherein the fourth and eighth layers comprise $NiNbTiO_x$, wherein the $NiNbTiO_x$ has an oxygen concentration of between 10 and 30 at %.

16. A coated article comprising: a substrate;
a first layer formed above the substrate,
  wherein the first layer comprises silicon nitride and has a thickness of 14 nm;
a second layer formed above the first layer,
  wherein the second layer comprises $Zn_2SnO_x$ and has a thickness of 12 nm;
a third layer formed above the second layer,
  wherein the third layer comprises zinc oxide and has a thickness of 4 nm;
a fourth layer formed above the third layer,
  wherein the fourth layer comprises silver and has a thickness of 9 nm;
a fifth layer formed above the fourth layer,
  wherein the fifth layer comprises nickel niobium titanium oxide and has a thickness of 2.4 nm;
a sixth layer formed directly on the fifth layer,
  wherein the sixth layer comprises zinc tin oxide and has a thickness of 74 nm;
a seventh layer formed above the sixth layer,
  wherein the seventh layer comprises zinc oxide and has a thickness of 4 nm;
a eighth layer formed above the seventh layer,
  wherein the eighth layer comprises silver and has a thickness of 14 nm;
an ninth layer formed above the eighth layer,
  wherein the ninth layer comprises nickel niobium titanium oxide and has a thickness of 2.4 nm;
a tenth layer formed above the ninth layer,
  wherein the tenth layer comprises $Zn_2SnO_x$ and has a thickness of 6 nm;
an eleventh layer formed above the tenth layer,
  wherein the eleventh layer comprises zinc oxide and has a thickness of 3 nm; and
a twelfth layer formed above the eleventh layer,
  wherein the twelfth layer comprises silicon nitride and has a thickness of 20 nm.

17. A coated article as in claim 16 wherein the first layer is formed directly on the substrate, the second layer is formed directly on the first layer, the third layer is formed directly on the second layer, the fourth layer is formed directly on the third layer, the fifth layer is formed directly on the fourth layer, the seventh layer is formed directly on the sixth layer, the eighth layer is formed directly on the seventh layer, the ninth layer is formed directly on the eighth layer, the tenth layer is formed directly on the ninth layer, the eleventh layer is formed directly on the tenth layer, and the twelfth layer is formed directly on the eleventh layer.

18. A coated article as in claim 17 wherein the nickel niobium titanium oxide of the sixth layer and the ninth layer has an oxygen concentration of between 10 and 30 at %.

* * * * *